United States Patent
Huang et al.

(10) Patent No.: US 12,505,874 B2
(45) Date of Patent: Dec. 23, 2025

(54) MULTIPLE DIODE REFERENCE READOUT CIRCUITRY OF A DEGRADATION SENSING CIRCUIT

(71) Applicant: Micron Technology, Inc., Boise, ID (US)

(72) Inventors: Zhi Qi Huang, Atlanta, GA (US); Dong Pan, Boise, ID (US); Scott D. Van De Graaff, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 114 days.

(21) Appl. No.: 18/425,149

(22) Filed: Jan. 29, 2024

(65) Prior Publication Data

US 2024/0386941 A1 Nov. 21, 2024

Related U.S. Application Data

(60) Provisional application No. 63/467,463, filed on May 18, 2023.

(51) Int. Cl.
| | |
|---|---|
| *G11C 11/4093* | (2006.01) |
| *G11C 5/14* | (2006.01) |
| *G11C 7/10* | (2006.01) |
| *G11C 29/02* | (2006.01) |
| *G11C 29/50* | (2006.01) |
| *G11C 11/4076* | (2006.01) |
| *G11C 29/12* | (2006.01) |

(52) U.S. Cl.
CPC .......... *G11C 11/4093* (2013.01); *G11C 5/147* (2013.01); *G11C 7/1069* (2013.01); *G11C 29/021* (2013.01); *G11C 29/028* (2013.01); *G11C 29/50004* (2013.01); *G11C 11/4076* (2013.01); *G11C 29/12005* (2013.01); *G11C 2029/5004* (2013.01)

(58) Field of Classification Search
CPC ............ G11C 29/50004; G11C 7/1069; G11C 11/4093; G11C 29/021; G11C 29/028; G11C 29/12005; G11C 5/147; G11C 11/4076; G11C 2029/5004
See application file for complete search history.

(56) References Cited

U.S. PATENT DOCUMENTS

| | | | | |
|---|---|---|---|---|
| 6,100,716 A | * | 8/2000 | Adham | ..................... H03K 5/08 |
| | | | | 327/321 |
| 7,859,906 B1 | * | 12/2010 | Vispute | .................. G11C 16/28 |
| | | | | 365/207 |

(Continued)

OTHER PUBLICATIONS

Dounavi, et al., "Aging Prediction and Tolerance for the SRAM Memory Cell and Sense Amplifier"; J Electron Test 37, 65-82 (2021). (Year: 2021).*

(Continued)

*Primary Examiner* — B. James Peikari
(74) *Attorney, Agent, or Firm* — Fletcher Yoder, P.C.

(57) ABSTRACT

Systems and methods described herein may increase voltages sensed during testing of a device-under-test, which may increase an ease of sensing by a comparator, where a relatively less sensitive comparator may be used to detect the increased voltage sensed. Indeed, readout circuitry may include two or more diodes coupled in series to a resistor, which may help increase the voltages sensed via the readout circuitry.

20 Claims, 5 Drawing Sheets

(56) References Cited

U.S. PATENT DOCUMENTS

| | | | |
|---|---|---|---|
| 10,643,125 B2* | 5/2020 | Ritter | G06N 3/049 |
| 11,132,469 B2 | 9/2021 | Plum et al. | |
| 2004/0263216 A1* | 12/2004 | Proll | G01R 31/2879 |
| | | | 327/78 |
| 2005/0105354 A1* | 5/2005 | Madan | G11C 11/22 |
| | | | 365/206 |
| 2014/0119076 A1* | 5/2014 | Chang | H02M 1/36 |
| | | | 363/80 |
| 2015/0084677 A1 | 3/2015 | Van de Graaff | |
| 2016/0334470 A1* | 11/2016 | Sandhu | G01R 19/16552 |
| 2020/0096556 A1 | 3/2020 | Plum et al. | |

OTHER PUBLICATIONS

Hong, et al., "Low-voltage DRAM sensing scheme with offset-cancellation sense amplifier"; IEEE Journal of Solid-State Circuits, vol. 37, No. 10, pp. 1356-1360, Oct. 2002. (Year: 2002).*

Sheng, et al., "Bit Upset and Performance Degradation of NAND Flash Memory Induced by Total Ionizing Dose Effects"; AIP Advances, Apr. 1, 2023; 13 (4): 045203. (Year: 2023).*

* cited by examiner

MULTIPLE DIODE REFERENCE READOUT CIRCUITRY OF A DEGRADATION SENSING CIRCUIT

CROSS-REFERENCE TO RELATED APPLICATIONS

This application claims priority to U.S. Provisional Application No. 63/467,463, filed May 18, 2023, entitled "MULTIPLIER BASED DEVICE DEGRADATION READOUT CIRCUIT," the disclosure of which is incorporated by reference in its entirety for all purposes.

BACKGROUND

Field of the Disclosure

The present disclosure relates to the field of semiconductor devices, and more specifically, to memory degradation monitoring systems and methods.

Description of the Related Art

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

The following relates generally to memory devices. Memory devices are widely used to store information in various electronic devices such as computers, wireless communication devices, cameras, digital displays, and the like. Information is stored by programming different states of a memory device. For example, binary devices have two states, often denoted by a logic "1" (e.g., a first binary value) or a logic "0" (e.g., a second binary value different from the first binary value). In other systems, more than two states may be stored. To access the stored information, the electronic device may read, or sense, the stored state in the memory device. To store information, the electronic device may write, or program, the state in the memory device.

Various types of memory devices exist, including random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, and others. Memory devices may be volatile or non-volatile. Some memory devices store data or operate based on switching operations, switch states, or the like. Switches may include any suitable device including transistors, such as bipolar junction transistors (BJTs), field effect transistors (FETs), metal oxide semiconductor FETs (MOSFETs), junction FETs (JFETs), insulated gate bipolar transistors (IGBTs), or the like.

Over time, transistors (e.g., switches) may degrade. Memory device performance and accuracy of data stored may be affected by the degradation of one or more transistors over time. Thus, a degradation sensing circuit may be included in a memory device to track and help compensate for this degradation.

BRIEF DESCRIPTION OF THE DRAWINGS

Various aspects of this disclosure may better be understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Memory may include switches, like transistors, and over time these transistors may undergo stress. A threshold voltage of one or more transistors may change or reduce overtime in response to the stress. The change of the threshold voltage may be referred to as transistor degradation. When a threshold amount of degradation occurs, memory device performance may be affected. For example, data stored may change over time or other effects caused by the degradation may manifest in memory operations.

To attempt to preserve memory device performance, one or more degradation sensing circuits may be included in a memory device. Output signals generated by the degradation sensing circuit may be indicative of the transistor degradation. Thus, the output signals may be used to track and aid in compensating for the degradation.

Readout circuitry systems may monitor device and/or transistor degradation associated with a device-under-test (DUT). One example readout circuitry may include a single diode coupled to a one-third (R/3) voltage divider circuit. DUTs over time may grow more efficient and thus now use lower value signals and/or more dense, smaller circuitries. Thus, readout circuitry systems may now read out relatively low voltages to a comparator to perform these monitoring operations. Although these low voltages may suitably indicate degradation, the degradation may be undetectable due to the voltage having a value below a voltage threshold detectable by the comparator.

To resolve this, a more accurate comparator may be used to detect the voltage from the readout circuitry. However, using a more accurate comparator may increase development time or costs as more resources are used to redesign circuitry to accommodate a new comparator. Furthermore, even if those costs are ignored, using the more accurate comparator may use more resources to operate since it may consume more power and/or have a relatively larger footprint than the originally used comparator. Thus, it may be desired to use different readout circuitry with the originally used comparator to sense the relatively low voltages of the DUT.

To avoid changing the comparator, readout circuitry described herein may use more than one diode (e.g., two diodes, three diodes) and may omit a one-third (R/3) voltage divider. By doing so, voltages sensed may be increased (e.g., amplified). Sensing relatively small voltage thresholds and amplifying these sensed voltages before transmitting to the comparator may enable the original comparator to be used.

Figure 1:
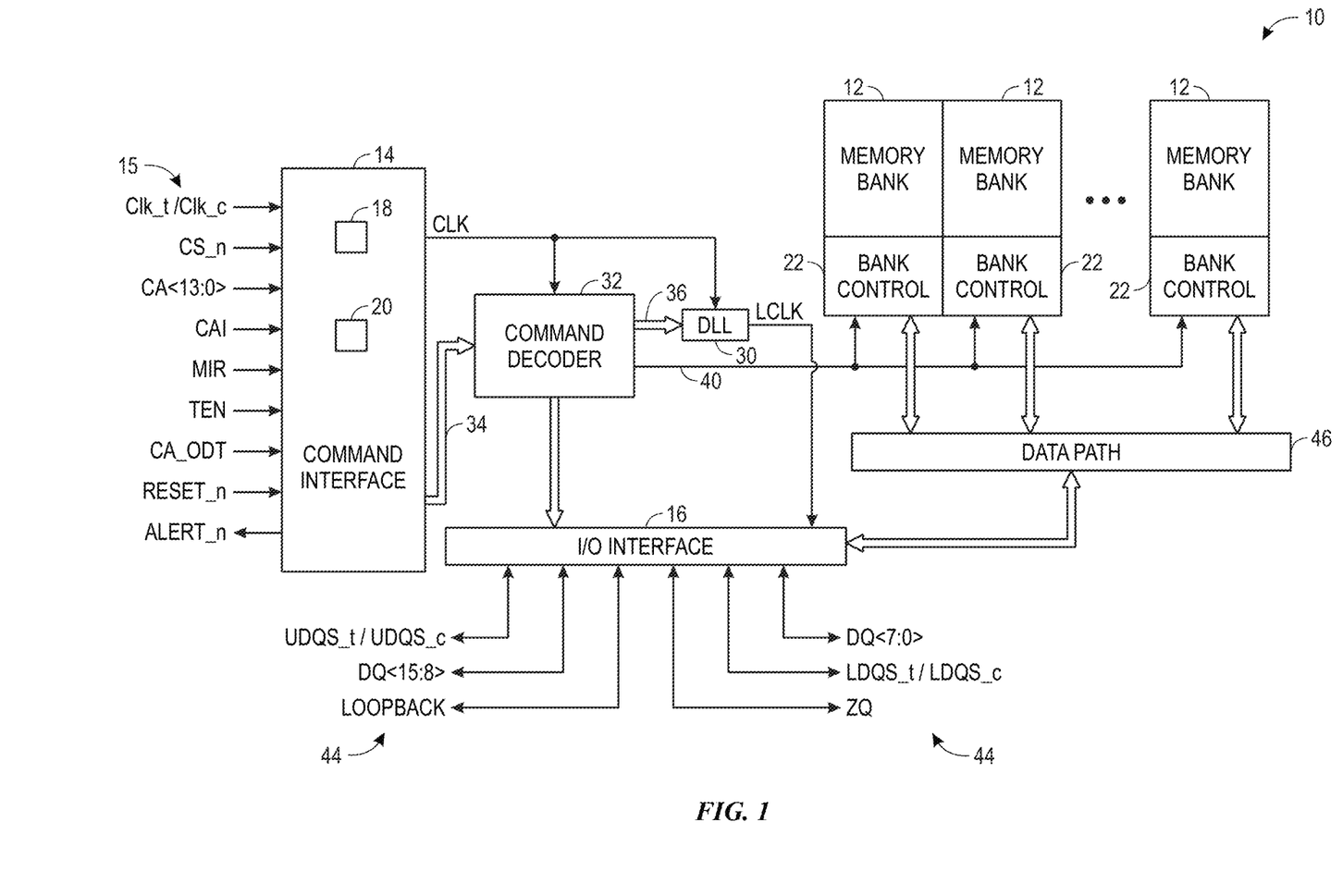
FIG. 1 is a simplified block diagram illustrating certain features of a memory device, according to an embodiment of the present disclosure.

Turning now to the figures, FIG. 1 is a simplified block diagram illustrating certain features of a memory device 10. Specifically, the block diagram of FIG. 1 is a functional block diagram illustrating certain functionality of the memory device 10. In accordance with one example, the memory device 10 may be a double data rate type five synchronous dynamic random-access memory (DDR5 SDRAM) device. Various features of DDR5 SDRAM allow for reduced power consumption, more bandwidth and more storage capacity compared to prior generations of DDR SDRAM.

The memory device 10 may include a number of memory banks 12. The memory banks 12 may be DDR5 SDRAM memory banks, for instance. The memory banks 12 may be provided on one or more chips (e.g., SDRAM chips) that are arranged on dual inline memory modules (DIMMS). Each DIMM may include a number of SDRAM memory chips (e.g., x4, x8, or x16 memory chips), as will be appreciated. Each SDRAM memory chip may include one or more memory banks 12. The memory device 10 represents a portion of a single memory chip (e.g., SDRAM chip) having a number of memory banks 12. For DDR5, the memory banks 12 may be further arranged to form bank groups. For instance, for an 8 gigabit (Gb) DDR5 SDRAM, the memory chip may include 16 memory banks 12, arranged into 8 bank groups, each bank group including 2 memory banks. For a 16 Gb DDR5 SDRAM, the memory chip may include 32 memory banks 12, arranged into 8 bank groups, each bank group including 4 memory banks, for instance. Various other configurations, organization, and sizes of the memory banks 12 on the memory device 10 may be utilized depending on the application and design of the overall system.

The memory device 10 may include a command interface 14 and an input/output (I/O) interface 16. The command interface 14 is configured to provide a number of signals (e.g., signals 15) from an external device (not shown), such as a processor or controller. The processor or controller may provide various signals 15 to the memory device 10 to facilitate the transmission and receipt of data to be written to or read from the memory device 10.

As will be appreciated, the command interface 14 may include a number of circuits, such as a clock input circuit 18 and a command address input circuit 20, for instance, to ensure proper handling of the signals 15. The command interface 14 may receive one or more clock signals from an external device. Generally, double data rate (DDR) memory utilizes a differential pair of system clock signals, referred to herein as the true clock signal (Clk_t) and the complementary clock signal (Clk_c). The positive clock edge for DDR refers to the point where the rising true clock signal Clk_t crosses the falling complementary clock signal Clk_c, while the negative clock edge indicates that transition of the falling true clock signal Clk_t and the rising of the complementary clock signal Clk_c. Commands (e.g., read command, write command, etc.) are typically entered on the positive edges of the clock signal and data is transmitted or received on both the positive and negative clock edges.

The clock input circuit 18 receives the true clock signal (Clk_t) and the complementary clock signal (Clk_c) and generates an internal clock signal CLK. The internal clock signal CLK is supplied to an internal clock generator 30, such as a delay locked loop (DLL) circuit. The internal clock generator 30 generates a phase controlled internal clock signal LCLK based on the received internal clock signal CLK. The phase controlled internal clock signal LCLK is supplied to the I/O interface 16, for instance, and is used as a timing signal for determining an output timing of read data.

The internal clock signal CLK may also be provided to various other components within the memory device 10 and may be used to generate various additional internal clock signals. For instance, the internal clock signal CLK may be provided to a command decoder 32. The command decoder 32 may receive command signals from the command bus 34 and may decode the command signals to provide various internal commands. For instance, the command decoder 32 may provide command signals to the internal clock generator 30 over the bus 36 to coordinate generation of the phase controlled internal clock signal LCLK. The phase controlled internal clock signal LCLK may be used to clock data through the IO interface 16, for instance.

Further, the command decoder 32 may decode commands, such as read commands, write commands, mode-register set commands, activate commands, etc., and provide access to a particular memory bank 12 corresponding to the command, via bus path 40. As will be appreciated, the memory device 10 may include various other decoders, such as row decoders and column decoders, to facilitate access to the memory banks 12. In one example, each memory bank 12 includes a bank control block 22 which performs decoding operations (e.g., via row decoder and column decoder), as well as other features, such as timing control and data control, to facilitate the execution of commands to and from the memory banks 12.

The memory device 10 executes operations, such as read commands and write commands, based on the command/address signals received from an external device, such as a processor. In one example, the command/address bus may be a 14-bit bus to accommodate the command/address signals (CA<13:0>). The command/address signals are clocked to the command interface 14 using the clock signals (Clk_t and Clk_c). The command interface may include a command address input circuit 20 which is configured to receive and transmit the commands to provide access to the memory banks 12, through the command decoder 32, for instance. In addition, the command interface 14 may receive a chip select signal (CS_n). The CS_n signal enables the memory device 10 to process commands on the incoming CA<13:0> bus. Access to specific banks 12 within the memory device 10 is encoded on the CA<13:0> bus with the commands.

In addition, the command interface 14 may be configured to receive a number of other command signals. For instance, a command/address on die termination (CA_ODT) signal may be provided to facilitate proper impedance matching within the memory device 10. A reset command (RESET_n) may be used to reset the command interface 14, status registers, state machines and the like, during power-up for instance. The command interface 14 may also receive a command/address invert (CAI) signal which may be provided to invert the state of command/address signals CA<13:0> on the command/address bus. A mirror (MIR) signal may also be provided to facilitate a mirror function. The MIR signal may be used to multiplex signals so that they can be swapped for enabling certain routing of signals to the memory device 10, based on the configuration of multiple memory devices in a particular application. Various signals to facilitate testing of the memory device 10, such as the test enable (TEN) signal, may be provided, as well. For instance, the TEN signal may be used to place the memory device 10 into a test mode for connectivity testing.

The command interface 14 may also be used to provide an alert signal (ALERT_n) to the system processor or controller for certain errors that may be detected. For instance, an alert signal (ALERT_n) may be transmitted from the memory device 10 if a cyclic redundancy check (CRC) error is detected. Other alert signals may also be generated. Further, the bus and pin for transmitting the alert signal (ALERT_n) from the memory device 10 may be used as an input pin during certain operations, such as the connectivity test mode executed using the TEN signal, as described above.

Data may be sent to and from the memory device 10, utilizing the command and clocking signals discussed above, by transmitting and receiving data signals 44 through the IO interface 16. More specifically, the data may be sent to or retrieved from the memory banks 12 over the data path 46, which includes a plurality of bi-directional data buses. Data IO signals, generally referred to as DQ signals, are generally transmitted and received in one or more bi-directional data busses. For certain memory devices, such as a DDR5 SDRAM memory device, the IO signals may be divided into upper and lower bytes. For instance, for a x16 memory device, the IO signals may be divided into upper and lower IO signals (e.g., DQ<15:8> and DQ<7:0>) corresponding to upper and lower bytes of the data signals, for instance.

To allow for higher data rates within the memory device 10, certain memory devices, such as DDR memory devices may utilize data strobe signals, generally referred to as DQS signals. The DQS signals are driven by the external processor or controller sending the data (e.g., for a write command) or by the memory device 10 (e.g., for a read command). For read commands, the DQS signals are effectively additional data output (DQ) signals with a predetermined pattern. For write commands, the DQS signals are used as clock signals to capture the corresponding input data. As with the clock signals (Clk_t and Clk_c), the data strobe (DQS) signals may be provided as a differential pair of data strobe signals (DQS_t and DQS_c) to provide differential pair signaling during reads and writes. For certain memory devices, such as a DDR5 SDRAM memory device, the differential pairs of DQS signals may be divided into upper and lower data strobe signals (e.g., UDQS_t and UDQS_c; LDQS_t and LDQS_c) corresponding to upper and lower bytes of data sent to and from the memory device 10, for instance.

An impedance (ZQ) calibration signal may also be provided to the memory device 10 through the IO interface 16. The ZQ calibration signal may be provided to a reference pin and used to tune output drivers and ODT values by adjusting pull-up and pull-down resistors of the memory device 10 across changes in process, voltage, and temperature (PVT) values. Because PVT characteristics may impact the ZQ resistor values, the ZQ calibration signal may be provided to the ZQ reference pin to be used to adjust the resistance to calibrate the input impedance to known values. As will be appreciated, a precision resistor is generally coupled between the ZQ pin on the memory device 10 and GND/Vss external to the memory device 10. This resistor acts as a reference for adjusting internal ODT and drive strength of the IO pins.

In addition, a loopback signal (LOOPBACK) may be provided to the memory device 10 through the IO interface 16. The loopback signal may be used during a test or debugging phase to set the memory device 10 into a mode wherein signals are looped back through the memory device 10 through the same pin. For instance, the loopback signal may be used to set the memory device 10 to test the data output (DQ) of the memory device 10. Loopback may include both a data and a strobe or possibly just a data pin. This is generally intended to be used to monitor the data captured by the memory device 10 at the IO interface 16.

As will be appreciated, various other components such as power supply circuits (for receiving external Vdd and Vss signals), mode registers (to define various modes of programmable operations and configurations), read/write amplifiers (to amplify signals during read/write operations), temperature sensors (for sensing temperatures of the memory device 10), etc., may also be incorporated into the memory device 10. Accordingly, it should be understood that the block diagram of FIG. 1 is only provided to highlight certain functional features of the memory device 10 to aid in the subsequent detailed description.

Figure 2:
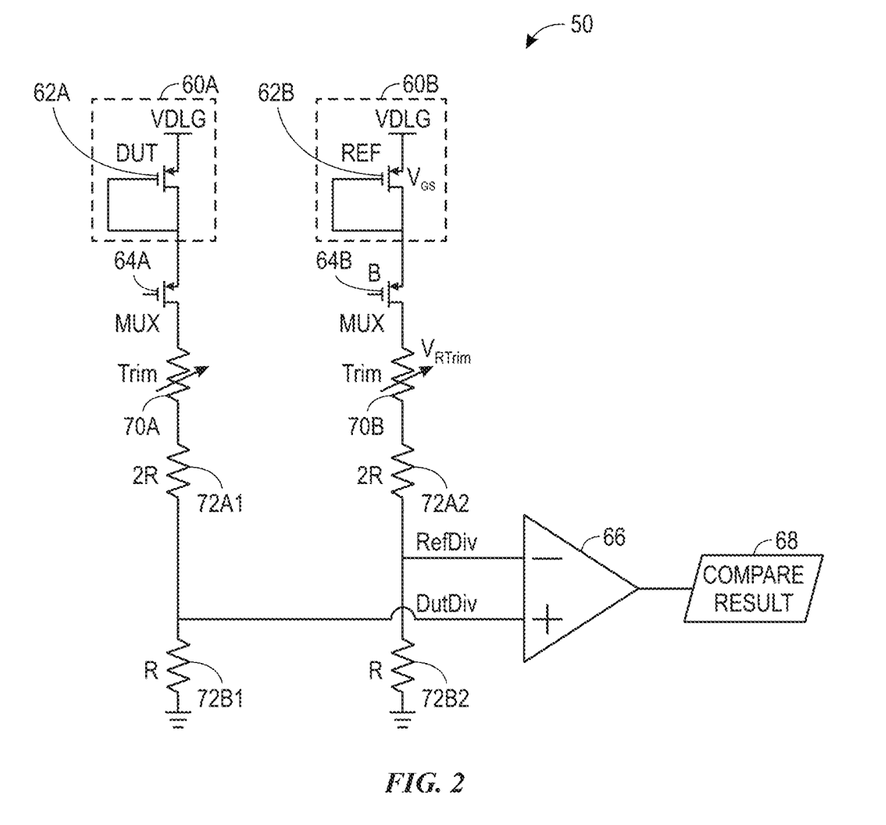
FIG. 2 is a schematic diagram illustrating a first degradation sensing circuit having first readout circuitry based on one diode, in accordance with an embodiment.

With the foregoing in mind, FIG. 2 is a schematic diagram illustrating a first degradation sensing circuit 50. The first degradation sensing circuit 50 may include readout circuitry 60 (e.g., a device-under-test (DUT) readout circuitry 60A, reference readout circuitry 60B). Each readout circuitry 60A, 60B may have one diode 62 (e.g., diode 62A, diode 62B) modelled by a p-channel MOSFET with the gate coupled to the drain. A memory control system (not illustrated) may operate the memory device 10 (e.g., a portion of the memory banks 12 or other suitable portion subjected to use over time to be tested for degradation) into a testing mode.

The memory control system may transmit one or more control signals (e.g., signal "MUX") to enable the sensing via switches, like transistors 64 (e.g., transistor 64A, transistor 64B). The transistors 64 may be coupled to programmable resistors 70 (e.g., resistor 70A, resistor 70B). The programmable resistors 70 may be coupled to resistors 72 (e.g., resistor 72A1, resistor 72A2). The resistor 72A1 may be coupled to a positive input (DutDiv) of the comparator 66 and a resistor 72B1, where the resistor 72B1 has half the resistance (e.g., R) of the resistor 72A1 (e.g., 2R). The resistor 72A2 may be coupled to a negative input (RefDiv) of the comparator 66 and a resistor 72B2, where the resistor 72B2 has half the resistance (e.g., R) of the resistor 72A2 (e.g., 2R) and where the resistor 72B2 is equal or substantially equal (e.g., within 1% variance, within a threshold of variance) in resistance to that of the resistor 72B1 (e.g., R).

Voltages sensed by each readout circuitry 60A, 60B are transmitted to a comparator 66 and used to generate a compare result 68. The compare result 68 may be a voltage output that varies based on a comparison between voltages at a positive input (via DutDiv path) and a negative input (via RefDiv) to the comparator 66. The compare result 68 may be used by the memory control system when adjusting operating parameters to compensate for DUT degradation.

While in the testing mode, the DUT readout circuitry 60A may be coupled to a DUT (e.g., target transistor of a memory device 10) and a supply voltage (VDLG). While in the testing mode, the reference readout circuitry 60B may be coupled to corresponding reference circuitry and/or the supply voltage (VDLG). The supply voltage (VDLG) may be a substantially constant voltage that does not vary beyond a threshold amount of voltage (e.g., 1%, N%) and may be distributed throughout the memory device as a power supply signal.

Both the DUT readout circuitry 60A and the reference readout circuitry 60B may transmit respective signals to a comparator 66. As a threshold voltage of the DUT changes over time, this change in threshold voltage may be detectable via changes in the voltage transmitted on the DutDiv path to the comparator 66. Indeed, the DUT readout circuitry 60A may generate and/or transmit an electrical signal (e.g., voltage), that changes value based on an amount of degradation to a threshold voltage of the DUT and based on the supply voltage (VDLG). The reference readout circuitry 60B may generate and/or transmit a relatively constant electrical signal to the comparator 66 based on the supply voltage (VDLG) and/or another constant voltage source. This relatively constant electrical signal (e.g., voltage, current) transmitted from the reference readout circuitry 60B may serve as a reference signal against which to compare the electrical signal (e.g., voltage, current) from the DUT readout circuitry 60A at the comparator 66. The voltage received at the negative input to the comparator 66 from the reference readout circuitry 60B may be determined based on the following relationship shown by Equation 1 below.

$$V_{RefDiv} = (VDLG - V_{GS} - V_{Rtrim})/3 \quad [1]$$

In Equation 1, a reference voltage ($V_{RefDiv}$) at the negative input to the comparator 66 may equal a difference between a supply voltage (VDLG), a voltage between a gate and a source of a transistor (e.g., diode 62) ($V_{GS}$) of the reference readout circuitry 60B, and a voltage across programmable resistor 70B ($V_{Rtrim}$), where the difference is divided by three. It is noted that the division by three is due to the voltage divider based on resistors 72 (e.g., resistor 72A2, resistor 72B2). Although the value of the electrical signal from the DUT readout circuitry 60A may change over time, the voltage difference between the positive input and the negative input to the comparator 66 is one third of the change in $V_{GS}$ (e.g., $\Delta V_{GS}$) between the $V_{GS}$ of the transistor (e.g., diode 62A) of the DUT readout circuitry 60A and the $V_{GS}$ of the transistor 62 (e.g., diode 62B) of the reference readout circuitry 60B. A similar relationship as to Equation 1 may be used to determine the DutDiv path voltage of FIG. 2. In this way, the resulting voltages, and thus differences between the voltages, may be relatively small. As noted earlier, a relatively high accuracy comparator may detect the relatively low voltages but may have a relatively larger footprint and/or consume more resources (e.g., power, computing) when detecting the lower voltages. Furthermore, additional resources and time may be used to redesign or implement use of the relatively high accuracy comparator in deployment.

Thus, improved systems and methods that preserve a quality of monitoring operations without relying on a relatively more accurate comparators may be desired. By changing a design of the first degradation sensing circuit 50, such as by removing components coupled between the readout circuitry 60 and the comparator 66 and increasing a number of diodes, relatively more detectable (e.g., greater) voltages may be transmitted to the comparator 66.

Figure 3:
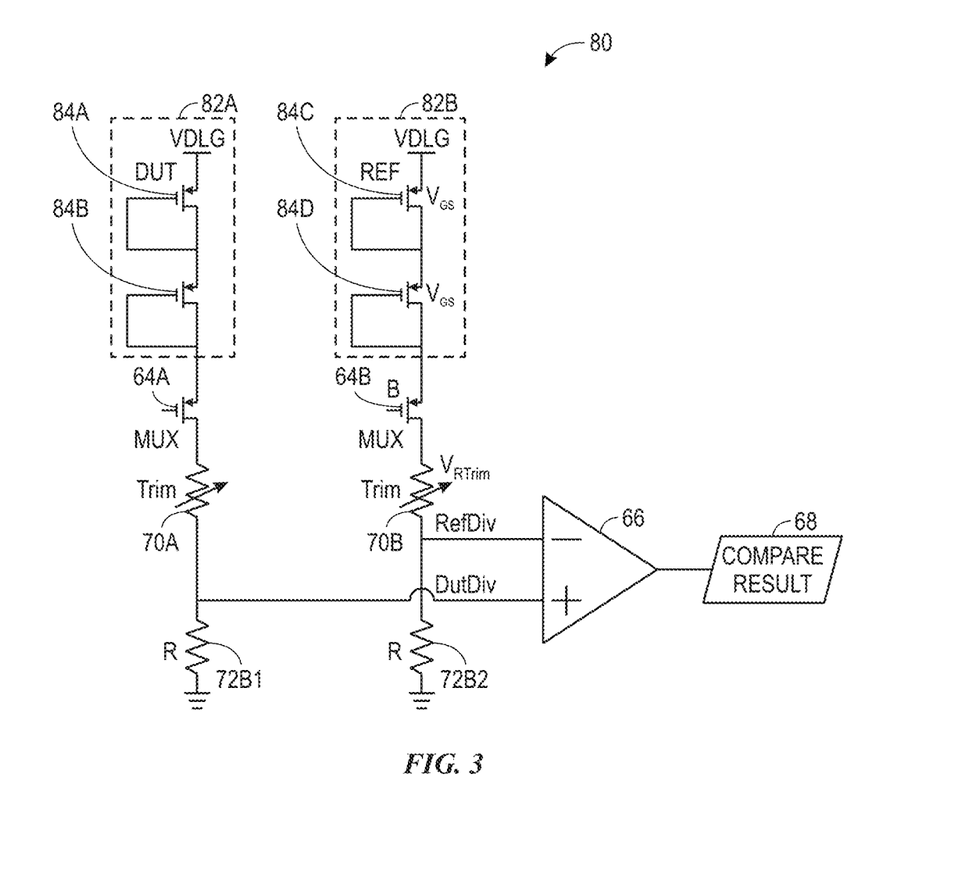
FIG. 3 is a schematic diagram illustrating a second degradation sensing circuit having second readout circuitry based on two diodes coupled in series, in accordance with an embodiment.

To elaborate, FIG. 3 is a schematic diagram illustrating second degradation sensing circuit 80 having readout circuitry 82 (e.g., DUT readout circuitry 82A, reference readout circuitry 82B). Like FIG. 2, the memory control system may operate the second degradation sensing circuit 80 to perform the sensing operations to generate a compare result 68. In some cases, the memory control system may operate the second degradation sensing circuit 80 into a testing mode to perform the sensing. Sensing data obtained via the second degradation sensing circuit 80 may be transmitted to a comparator 66 and used to generate the compare result 68. As described above, the compare result 68 may be a voltage output that varies based on a comparison between voltages at a positive input and a negative input to the comparator 66. The compare result 68 may be used by the memory control system when adjusting operating parameters to compensate for DUT degradation.

The second degradation sensing circuit 80 may be based on two diodes 84 (e.g., diode 84A and diode 84B, diode 84C and diode 84D) coupled in series. Here, the diodes 84 are respectively modelled with an n-channel MOSFET having the gate coupled to the drain. The diodes 84 may be respectively coupled to transistors 64 (e.g., transistor 64A, transistor 64B). The transistors 64 may be respectively coupled to programmable resistors 70 (e.g., programmable resistor 70A, programmable resistor 70B). The programmable resistors 70 may be coupled to the comparator 66 and be respectively coupled to resistors 72 (e.g., resistor 72B1, resistor 72B2). Some of these components are the same as illustrated with FIG. 2, and thus some of these descriptions are relied on herein.

While in the testing mode, the second degradation sensing circuit 80 may be coupled to a DUT and corresponding reference circuitry, enabling the second degradation sensing circuit 80 to perform a degradation sensing operation that generates the compare result 68. Any suitable device may be tested for degradation, for example a transistor. Thus, the DUT may be a transistor and degradation being sensed may result in changes to a threshold voltage of the DUT.

To sense Vth shift (e.g., degradation), the DUT readout circuitry 82A may generate and/or transmit an electrical signal (e.g., voltage), that changes value based on an amount of degradation to a threshold voltage of the DUT. The DUT readout circuitry 82A may do so based on changes to the voltage transmitted via diode 84A and via diode 84B and based on a supply voltage (VDLG). The reference readout circuitry 82B may generate and/or transmit a relatively constant electrical signal to the comparator 66 based on the supply voltage (VDLG) and its diodes 84. This relatively constant electrical signal may serve as a reference signal against which to compare the electrical signal from the DUT readout circuitry 82A at the comparator 66. The voltage received at the negative input to the comparator 66 from the reference readout circuitry 82B may be determined based on the following relationship shown by Equation 2 below.

$$V_{RefDiv} = (VDLG - 2*V_{GS} - V_{Rtrim}) \quad [2]$$

In Equation 2, a reference voltage ($V_{RefDiv}$) at the negative input to the comparator 66 may equal a difference between a supply voltage (VDLG), two multiplied by the voltage between a gate and a source of transistors (e.g., diodes 84C, 84D) (2*$V_{GS}$), and a voltage across programmable resistor 70B ($V_{Rtrim}$), where the difference is not divided by three. The difference is not divided by three based on how the programmable resistor 70B (Trim) is directly coupled to the transistor 64B (MUX), the comparator 66, and the resistor 72B2. A similar relationship as to Equation 2 may be used to determine the DutDiv path voltage of FIG. 3.

Indeed, the second degradation sensing circuit 80 omits some of the resistors (e.g., resistors 72A1, 72A2) that were included in the first degradation sensing circuit 50 and doubles the number of diodes for each readout circuitry 82. By doing so, any Vth shift captured by the second degradation sensing circuit 80 may be enlarged by at least 2× relative to the first degradation sensing circuit 50. Indeed, although the value of the electrical signal from the DUT readout circuitry 82A may change over time, the voltage difference between the positive input and the negative input to the comparator 66 is double the change in $V_{GS}$, yielding a relatively more detectable change in voltage relative to systems and methods of FIG. 2.

It is noted that the second degradation sensing circuit 80 may correspond to a Positive Bias Temperature Instability (PBTI) readout operation, which may be used when the DUT is a n-channel device. PBTI readout operations may test performance of the DUT at different temperatures and voltages to better adjust operating parameters to compensate for detected degradation. By doing so, the memory control system may maintain and preserve reliability of the memory device over time, despite components of the memory device degrading with use. Like PBTI readout operations, Negative Bias Temperature Instability (NBTI) readout operations may be used with the DUT is a p-channel device. NBTI readout operations similarly test performance of the DUT at different temperatures and voltages and enable the memory control system to have data to use when adjusting operating parameters to compensate for detected degradation. Third readout circuitry of FIG. 4 may correspond to NBTI readout operations and be used when the DUT is a p-channel device.

Figure 4:
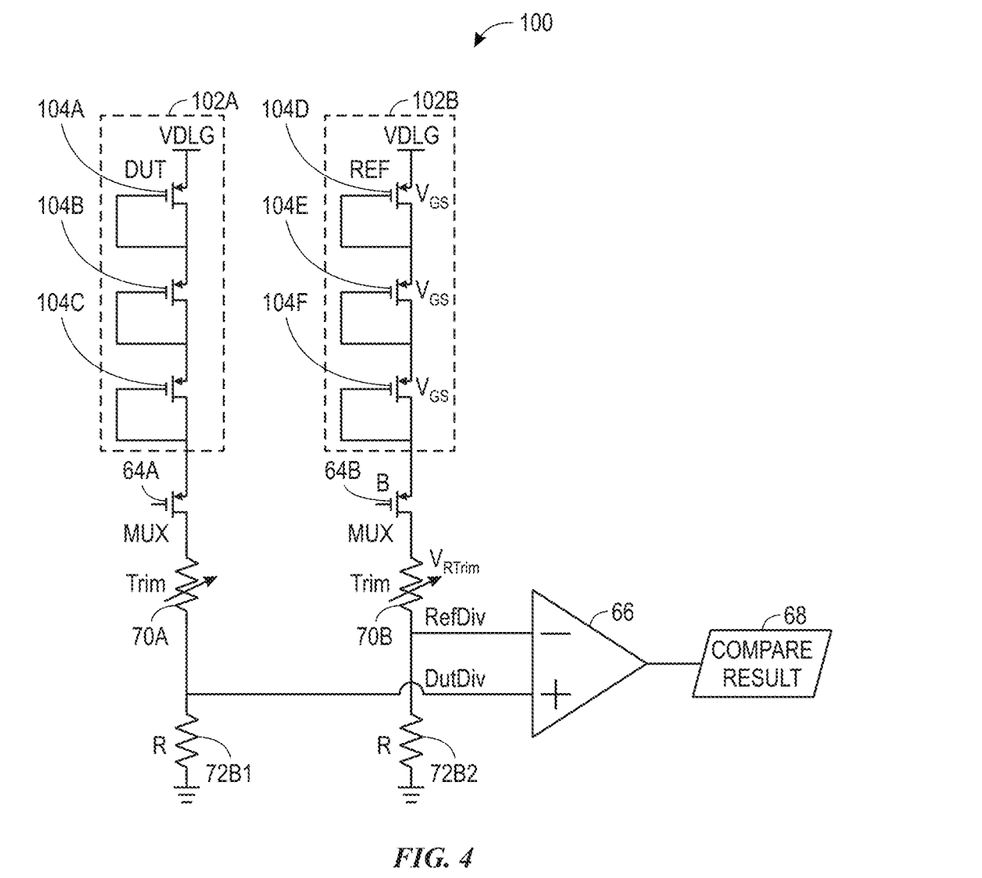
FIG. 4 is a schematic diagram illustrating a third degradation sensing circuit having third readout circuitry based on three diodes coupled in series, in accordance with an embodiment.

To elaborate on the third readout circuitry, FIG. 4 is a schematic diagram illustrating third degradation sensing circuit 100 that includes readout circuitry 102 (e.g., DUT readout circuitry 102A, reference readout circuitry 102B). The readout circuitry 102 includes subsets of diodes 104 (e.g., diode 104A, diode 104B and diode 104C, diode 104D, diode 104E and diode 104F) coupled in series. The third degradation sensing circuit 100 operates similarly to the second degradation sensing circuit 80 and thus those descriptions are relied on herein.

Like the second degradation sensing circuit 80, sensing data obtained via the third degradation sensing circuit 100 may be transmitted to the comparator 66 and used to generate the compare result 68. The compare result 68 may be a voltage output that varies based on a comparison between voltages at the positive input and the negative input to the comparator 66. The compare result 68 may be used by the memory control system when adjusting operating parameters to compensate for DUT degradation.

By including three diodes 104D, 104E, 104F, the voltage received at the negative input to the comparator 66 from the reference readout circuitry 102B may be determined based on the following relationship shown by Equation 3 below.

$$V_{RefDiv} = (VDLG - 3 * V_{GS} - V_{Rtrim})  \quad [3]$$

In Equation 3, a reference voltage ($V_{RefDiv}$) at the negative input to the comparator 66 may be equal to the supply voltage (VDLG) minus three times the voltage between a gate and a source of transistors (e.g., diodes 104) (3*VGs) minus a voltage across programmable resistor ($V_{Rtrim}$), where the difference is not divided by three. The difference is not divided by three based on how the programmable resistor 70B (trim) is directly coupled to the transistor 64B (MUX), the comparator 66, and the resistor 72B2. A similar relationship as to Equation 3 may be used to determine the DutDiv path voltage of FIG. 4. Although the value of the electrical signal from the DUT readout circuitry 102A may change over time, the voltage difference between the positive input and the negative input to the comparator 66 to detect the change in $V_{GS}$ is based on voltage values approximately tripled relative to voltages of systems of FIG. 2. This may result in a relatively more detectable change in voltage relative to systems and methods of FIG. 2 and, thus, a relatively more robust sensing system.

Indeed, the third degradation sensing circuit 100 omits some of the resistors (e.g., resistors 72A1, 72A2) that were included in the degradation sensing circuit 50 and triples the number of diodes for each readout circuitry 102. By doing so, any Vth shift captured by the third degradation sensing circuit 80 may be enlarged by at least 3× relative to the first degradation sensing circuit 50. Indeed, although the value of the electrical signal from the DUT readout circuitry 82A may change over time, the voltage difference between the positive input and the negative input to the comparator 66 is double the change in $V_{GS}$, yielding a relatively more detectable change in voltage relative to systems and methods of FIG. 2.

Figure 5:
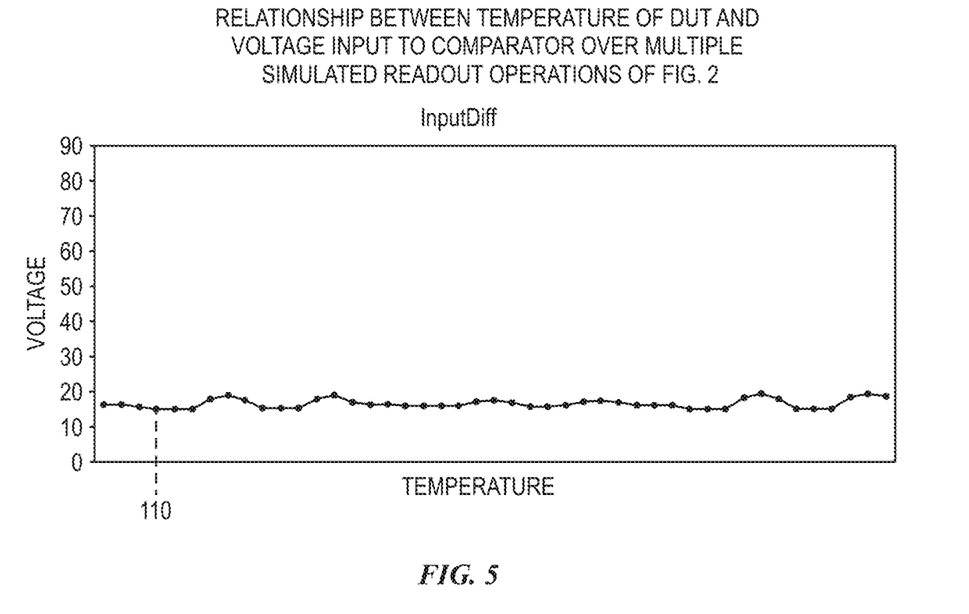
FIG. 5 is a plot illustrating a simulated input to the comparator generated by the first degradation sensing circuit of FIG. 2, in accordance with an embodiment.
Figure 6:
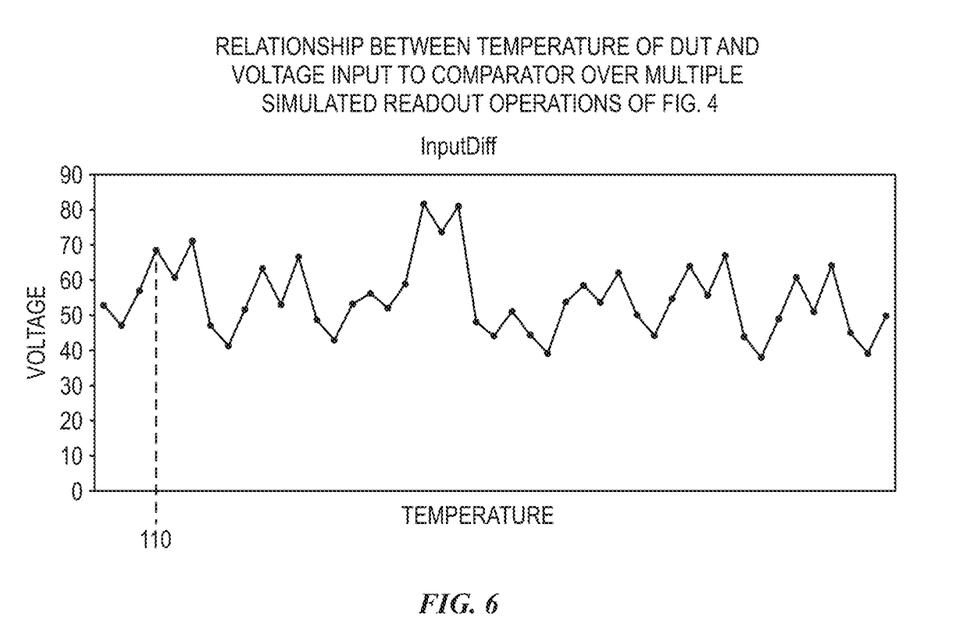
FIG. 6 is a plot illustrating a simulated input to the comparator generated by the third degradation sensing circuit of FIG. 4, in accordance with an embodiment.

FIG. 5 is a plot illustrating a relationship between temperature and comparator input voltage (V) levels over multiple simulated readout operations of first degradation sensing circuit 50 of FIG. 2. FIG. 6 is a plot illustrating a relationship between temperature and comparator input voltage (V) levels over multiple simulated readout operations of third degradation sensing circuit 100 of FIG. 4. For ease of discussion, FIGS. 5 and 6 are described together herein. FIGS. 5 and 6 illustrate how the third degradation sensing circuit 100 of FIG. 4 may increase a voltage value of input signals transmitted to the comparator 66. Indeed, as an example, at temperature 110, one voltage transmitted to the comparator 66 of FIG. 4 in a simulated test equals approximately 40 millivolts (mV) while another voltage transmitted to the comparator 66 of FIG. 2 in a simulated test equals approximately 15 mV, which corresponds to an approximately 2.7× increase in voltage value. Thus, there may be desirable outcomes from using systems and methods described by FIGS. 3 and 4 relative to systems and methods based on one diode readout circuitry described by FIG. 2.

In some systems, one or more second degradation sensing circuits 80 and/or one or more third degradation sensing circuits 100 may be used. Control signals delivered to the degradation sensing circuits 80, 100 may enable or disable sensing to occur. As described above, transistors 64 may be closed via the one or more control signals (e.g., signal "MUX") when that corresponding degradation sensing circuit is to be used. Enabling or disabling sensing operations may facilitate reducing power consumed during periods of inactivity (e.g., as opposed to leaving the sensing circuitry enabled and consuming power) and/or may facilitate switching between different sensing modes. Indeed, in some cases, the control signals may be generated to toggle between different sensing modes. For example, a different sensing mode may be used for a DUT being a n-channel transistor than a sensing mode used for a DUT being a p-channel transistor. Processing circuitry (e.g., a memory controller) may generate the control signals to control changing between sensing modes. When the processing circuitry determines that the DUT is a n-channel transistor, the processing circuitry may generate control signals to enter a sensing mode that uses the one or more second degradation sensing circuits 80. However, if the processing circuitry determines that the DUT is a p-channel transistor, the processing circuitry may generate control signals to enter a sensing mode that uses the one or more third degradation sensing circuits 100. Other sensing modes may be used.

To elaborate further on sensing operations, some memory systems may use the compare result 68 in compensation operations. These systems and methods may involve receiving, via a memory controller, a first voltage signal at a first time from a comparator 66 indicative of a first voltage difference (e.g., compare result 68 at a first time). The first voltage difference may be generated based on two or more diodes (e.g., diodes 84, diodes 104) and indicates a first threshold voltage of a DUT. The memory controller may receive a second voltage signal at a second time from the comparator 66 indicative of a second voltage difference (e.g., compare result 68 at a second time). The second voltage difference may be generated based on the two or more diodes and indicates a second threshold voltage of the DUT. The memory controller may determine a difference between the first voltage signal and a second voltage signal and may, based on the difference, determine an operational change to apply to a memory device to compensate for the difference. The memory device may include the DUT or the DUT may be representative of degradation experienced by the memory device over time through exposure to temperature (e.g., temperatures greater than a threshold temperature, temperatures less than a threshold temperature) and/or use (e.g., access to data stored via the memory device). In this way, the DUT may be associated with a memory device and the DUT may be characterized by, at the first time, a first threshold voltage and, at the second time, a second threshold voltage. A difference sensed by readout circuitry 82, 102 between the second threshold voltage and the first threshold voltage may indicate degradation of the memory device and thus may be used by a memory controller when adjusting operation to compensate the degradation and/or notifying an operator of the degradation.

Systems and methods described herein may increase voltages sensed during testing of a device-under-test. When greater values of voltages are to be compared, a comparator may use less resources to perform the comparison. The systems and methods may be based on readout circuitry. First readout circuitry may include two or more diodes coupled in series to a first resistor, which may help increase the voltages sensed via the first readout circuitry. To do so, readout circuitry may use more than one diode (e.g., two diodes, three diodes) and not include a one-third voltage divider. By doing so, sensing voltages may be increased and thus may preserve readout accuracy independent of increasing an accuracy of the comparator. Obtaining the compare result from the comparator may be applied to Positive Bias Temperature Instability (PBTI) readout operations and/or Negative Bias Temperature Instability (NBTI) readout operations. PBTI and/or NBTI readout operations may test performance of the DUT at different temperatures and voltages to better adjust operating parameters to compensate for detected degradation. By doing so, the memory control system may maintain and preserve reliability of the memory device over time, despite components of the memory device degrading with use or exposure to temperatures that cross a desired threshold (e.g., hot/cold extremes).

While the embodiments described herein may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the techniques and system described in the disclosure as defined by the following appended claims.

What is claimed is:

1. A circuit, comprising:
   a first readout circuitry comprising a first diode and a second diode coupled in series to a first resistor;
   a second readout circuitry comprising a third diode and a fourth diode coupled in series to a second resistor; and
   a comparator coupled to:
   the first resistor at a first input of the comparator; and
   the second resistor at a second input of the comparator.

2. The circuit of claim 1, wherein the first readout circuitry comprises a fifth diode coupled to the second diode, and wherein the fifth diode is coupled in series to the first resistor.

3. The circuit of claim 2, wherein the second readout circuitry comprises a sixth diode coupled to the fourth diode, and wherein the sixth diode is coupled in series to the second resistor.

4. The circuit of claim 3, wherein the first resistor is coupled to a third resistor, and wherein the second resistor is coupled to a fourth resistor.

5. The circuit of claim 1, wherein the first readout circuitry shares a supply voltage with the second readout circuitry.

6. The circuit of claim 1, wherein the first resistor is characterized by a programmable resistance.

7. The circuit of claim 1, wherein the second resistor is characterized by a programmable resistance, and wherein the first resistor and the second resistor are characterized by different resistances.

8. A system comprising:
   a device-under-test associated with a memory device, wherein the device-under-test is characterized by:
   at a first time, a first threshold voltage; and
   at a second time, a second threshold voltage;
   a degradation sensing circuit comprising four or more diodes, wherein the degradation sensing circuit, in response to receiving a supply voltage, outputs, at different times, a first voltage based on the first threshold voltage and a second voltage based on the second threshold voltage, wherein the four or more diodes comprises a first diode and a second diode, and wherein the degradation sensing circuit comprises:
   a first readout circuitry comprising the first diode and the second diode coupled in series to a first resistor; and
   a memory controller configured to:
   receive the first voltage and the second voltage; and
   determine an operational change to apply to the memory device to compensate for a difference between the first voltage and the second voltage.

9. The system of claim 8, wherein the four or more diodes comprises a third diode and a fourth diode, and wherein the degradation sensing circuit comprises:

a second readout circuitry comprising the third diode and the fourth diode coupled in series to a second resistor; and a comparator coupled to:
the first resistor at a first input of the comparator; and
the second resistor at a second input of the comparator, and wherein the comparator is configured to generate the first voltage and the second voltage.

10. The system of claim 9, wherein the first readout circuitry and the second readout circuitry receive the supply voltage at the different times.

11. The system of claim 9, wherein the first readout circuitry comprises a fifth diode coupled to the second diode, and wherein the fifth diode is coupled in series to the first resistor.

12. The system of claim 8, wherein the memory controller is configured to generate a control signal to switch between the degradation sensing circuit and an additional degradation sensing circuit.

13. The system of claim 12, wherein the degradation sensing circuit comprises four diodes as the four or more diodes, and wherein the additional degradation sensing circuit comprises six diodes.

14. The system of claim 13, wherein the additional degradation sensing circuit is operable to sense p-channel transistor degradation.

15. The system of claim 8, wherein the memory controller is configured to apply the operational change to the memory device.

16. A system comprising:
a supply voltage path;
a degradation sensing circuit comprising:
a first readout circuitry comprising a first diode and a second diode coupled in series to a first resistor and coupled to the supply voltage path; and
a second readout circuitry comprising a third diode and a fourth diode coupled in series to a second resistor and coupled to the supply voltage path; and
a comparator coupled to:
the first resistor at a positive input of the comparator; and
the second resistor at a negative input of the comparator.

17. The system of claim 16, wherein the first resistor is characterized by a first programmable resistance, and wherein the second resistor is characterized by a second programmable resistance.

18. The system of claim 16, wherein the supply voltage path is operable to transmit a supply voltage, wherein the first readout circuitry:
outputs, at a first time, a first voltage based on a first threshold voltage and the supply voltage.

19. The system of claim 18, comprising a device-under-test associated with a memory device, wherein the device-under-test is characterized by:
at the first time, the first threshold voltage; and
at the second time, the second threshold voltage, wherein a difference between the second threshold voltage and the first threshold voltage indicates degradation of the memory device.

20. The system of claim 18, comprising a memory controller configured to:
receive the first voltage and the second voltage; and
determine an operational change to apply to a memory device to compensate for a voltage difference between the first voltage and the second voltage.

* * * * *